United States Patent
Yang et al.

(10) Patent No.: US 9,750,077 B2
(45) Date of Patent: Aug. 29, 2017

(54) NETWORK CONNECTION OR DISCONNECTION FOR MOBILE DEVICES

(71) Applicant: INTEL IP CORPORATION, Santa Clara, CA (US)

(72) Inventors: Yang Daniel Yang, Shanghai (CN); Tian Wu Yang, Shanghai (CN); Jian Lin Jianlin Zhang, Shanghai (CN)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/129,580

(22) PCT Filed: Sep. 6, 2013

(86) PCT No.: PCT/CN2013/001052
§ 371 (c)(1),
(2) Date: Dec. 27, 2013

(87) PCT Pub. No.: WO2015/032013
PCT Pub. Date: Mar. 12, 2015

(65) Prior Publication Data
US 2015/0208463 A1    Jul. 23, 2015

(51) Int. Cl.
*H04W 4/00* (2009.01)
*H04W 76/06* (2009.01)
(Continued)

(52) U.S. Cl.
CPC .......... *H04W 76/06* (2013.01); *H04W 48/16* (2013.01); *H04W 76/064* (2013.01);
(Continued)

(58) Field of Classification Search
CPC .................................................... H04W 76/06
See application file for complete search history.

(56) References Cited

U.S. PATENT DOCUMENTS

2007/0291670 A1* 12/2007 Pettersson ........... H04W 76/022
370/310
2009/0207812 A1   8/2009 Gupta et al.
(Continued)

FOREIGN PATENT DOCUMENTS

CN        1997008      * 12/2006
CN        1997008 A      7/2011
(Continued)

OTHER PUBLICATIONS

International Search Report received for PCT Application No. PCT/CN2013/001052, mailed on Jun. 10, 2014, 12 pages.

*Primary Examiner* — Afshawn Towfighi
(74) *Attorney, Agent, or Firm* — Viering, Jentschura & Partner mbB (57) ABSTRACT

A communication device, user equipment, and a communication system are provided. The communication device comprises a Context ID check module to check a Context ID (CID) of a current default bearer in response to a disconnect command from a host; wherein, if the Context ID check module determines that there is only a first default bearer activated, the Context ID check module releases the connection between the communication device and the host without deactivating the first default bearer; and if the Context ID check module determines that there are two default bearers activated, the Context ID check module releases the second default bearer.

20 Claims, 4 Drawing Sheets (51) Int. Cl.
*H04W 48/16* (2009.01)
*H04W 88/08* (2009.01)
*H04W 76/02* (2009.01)

(52) U.S. Cl.
CPC ........ *H04W 76/022* (2013.01); *H04W 76/027* (2013.01); *H04W 88/08* (2013.01)

(56) References Cited

U.S. PATENT DOCUMENTS

| | | | |
|---|---|---|---|
| 2011/0235614 A1 | 9/2011 | Lerzer et al. | |
| 2012/0057576 A1* | 3/2012 | Neil | H04W 88/08 370/338 |
| 2012/0250601 A1* | 10/2012 | Choi | H04W 88/04 370/315 |
| 2014/0204736 A1* | 7/2014 | Bakker | H04W 8/22 370/230 |
| 2014/0241264 A1* | 8/2014 | Liu | H04W 76/062 370/329 |

FOREIGN PATENT DOCUMENTS

| | | | |
|---|---|---|---|
| CN | 102165837 A | | 8/2011 |
| EP | 2 170 000 | * | 3/2010 |
| WO | 2010113528 A1 | | 10/2010 |

* cited by examiner

NETWORK CONNECTION OR DISCONNECTION FOR MOBILE DEVICES

CROSS-REFERENCE TO RELATED APPLICATION

This application is a national stage entry according to 35 U.S.C. §371 of PCT application No.: PCT/CN2013/001052 filed on Sep. 6, 2013 and is incorporated herein by reference in its entirety.

TECHNICAL FIELD

The present disclosure relates to network connection or disconnection for mobile devices, such as User Equipment (UE).

BACKGROUND

Currently, many use USB communication devices (such as USB modems), mini PCI communication devices (such as mini PCI modems), or Mi-Fi routers to connect to the internet via a 2G, 3G or 4G wireless network. The most recent form of wireless internet connections on computer desktops is the new 4G internet connection. In telecommunications, 4G is the fourth generation of mobile communication technology standards. It is a successor of the third generation of mobile communication technology (3G) standards. A 4G system provides mobile ultra-broadband Internet access, for example to laptops with USB wireless communication device (such as USB wireless modem), to smart phones, and to other mobile devices. Conceivable applications include amended mobile web access, IP telephony, gaming services, high-definition mobile TV, video conferencing, 3D television and cloud computing. Two 4G candidate systems are commercially deployed: the Mobile WiMAX standard (at first in South Korea in 2006), and the first-release Long Term Evolution (LTE) standard (in Oslo, Norway and Stockholm, Sweden since 2009). This type of connection was made with both desktops and laptops in mind. A 4G internet connection gives user blazing speed and great response time that is comparable to DSL or cable internet. This means that user may watch HD quality streaming TV from sites such as Fancast or Hulu. Since is the delivery is performed wirelessly, content may be delivered to users wherever 4G internet signal is available.

Typically, mobile broadband devices (such as the USB communication device mentioned above) come with radio and connection management software. Device manufacturers, PC manufacturers, and mobile operators all develop, distribute, and support these applications for user to connect to their networks, configure radios and connection settings, and get contact information for help and support. Prior to the current operating system now offered, users need these applications to compensate for functionalities not provided natively in the operating system itself. This additional software confused and frustrated many users by conflicting with the operating system connections, showing different networks, network status, and a separate user interface. The new operating system eliminates this confusion by providing simple, intuitive, and fully integrated radio and connection management. The new network settings allow user to configure individual radios to turn it on or off (Wi-Fi, mobile broadband, or Bluetooth), as well as disable all radios at once with the new "airplane mode." It provides native radio management to eliminate the conflicts and confusion, and to provide a consistent experience for controlling your radios without the need to install additional software.

However, although several advantages as mentioned above may be achieved in employing the new operating system, there is a drawback for the new operating system. For example, in the case of LTE capable communication devices (such as LTE capable modems) on the new operating system registering to an LTE Network, only the first connection to the LTE network is possible. A "Connect" button will not appear on a Network panel of a host after a "Disconnect" button on the Network panel of the host is clicked. This is because there is only a PS domain (i.e. Packet Switching domain) in LTE mode, and the communication device such as modem will be detached from the network if the last PDN (i.e. Public Data Network) connection is deactivated. Then, it is necessary for the communication device to be reset or disabled/enabled in a device manager after this deactivating behavior so as to resolve such issue. Generally speaking, this issue usually relates to an LTE feature on certain new operating systems, in which a PS attach (i.e. Packet Switching attach) is combined with a PDP (i.e. Packet Data Protocol) activation.

There is no such problem for the communication devices such as modems on older operating systems. When the PS attach is completed, one default bearer is activated. IP address, DNS (Domain Name System), APN (Access Point Name) are allocated by the network. The "Connect" click will setup the connection between the host and the communication devices such as modems, the host will gain IP, DNS address related information. Data service will then work from now. The "Disconnect" click will trigger disconnection between the host and the above-mentioned communication device, and send a PDP deactivation request to the network. This procedure works well with 2G/3G mode because there are both PS domain and CS domain (i.e. Circuit Switching domain) in 2G/3G mode, and if the PS domain is detached, the communication device is still in registered state with the CS domain.

If the communication devices such as modem is in LTE mode, the last default bearer cannot be deactivated, because if the last default bearer is deactivated, the communication device will deregister from the network and enter "NO SERVICE" state. In this state, the "Connect" button will never show up on the Network panel of the host. Then, the communication devices will not register until the communication devices or communication interface driver reset is forced.

Therefore, it would be advantageous to have a method, system, device and computer program product that addresses one or more of the issues discussed above.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

Some terms are used for denoting specific system components throughout the application document. As would be appreciated by those skilled in the art, different designations may usually be used for denoting the same component, thus the application document does not intend to distinguish those components that are only different in name rather than in function. In the application document, terms "comprise", "include" and "have" are used in the opening way, and thus they shall be construed as meaning "comprise but not limited to . . . ". Besides, the term "coupled", as may be used herein, includes direct coupling and indirect coupling via another component. Inferred coupling, for example where one element is coupled to another element by inference, includes direct and indirect coupling between two elements in the same manner as "coupled".

The following detailed description refers to the accompanying drawings that show, by way of illustration, specific details and aspects of this disclosure. The word "exemplary" is used herein to mean "serving as an example, instance, or illustration". Any aspect of this disclosure or design described herein as "exemplary" is not necessarily to be construed as preferred or advantageous over other aspects of this disclosure or designs.

Some FIGURES may use similar reference numbers. This is merely to indicate that the same number in different FIGURES may be similar types of items. However, the same number in different FIGURES may be each its own iteration or aspect of this disclosure.

Figure 1:
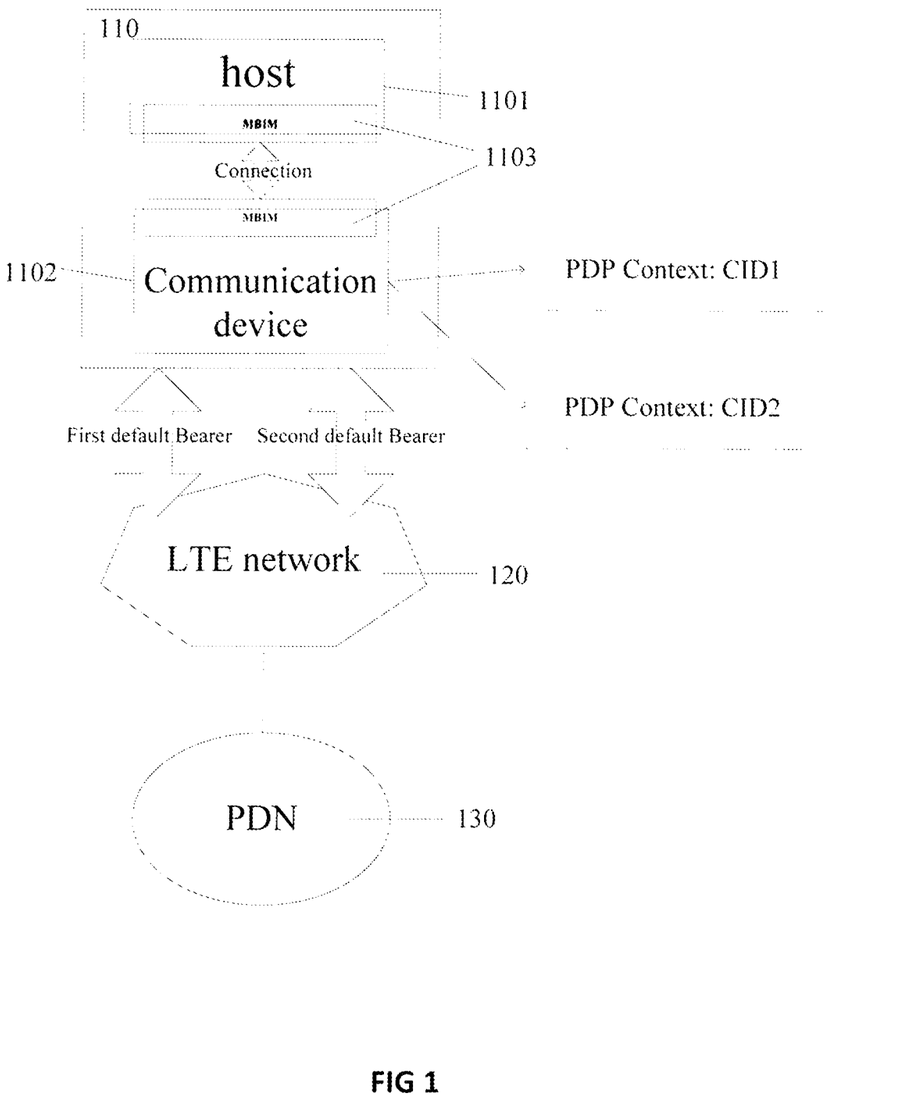
FIG 1 is an illustration of a block diagram of an exemplary communication system in accordance with an aspect of this disclosure.

In FIG. 1, there is provided a block diagram of an exemplary communication system in accordance with an aspect of this disclosure.

As shown in FIG. 1, the communication system comprises a mobile device or User Equipment 110, a mobile communication network such as an LTE network 120, and a PDN (Public Data Network) 130. The Mobile device or UE 110 comprises a host 1101 and a communication device (for example but not limited to a modem) 1102. The host 1101 interfaces to the communication device 1102 via a communication interface, such as MBIM (Mobile Broadband Interface Model) interface 1103, as shown in FIG. 1.

In the Universal Mobile Telecommunications System (UMTS) and 3GPP Long Term Evolution (LTE), UE is any device used directly by an end-user for communication. It may be a hand-held telephone, a laptop or desktop computer equipped with a mobile broadband adapter, or any other device. It connects to the base station Node B/eNodeB as specified in the standards such as ETSI 125/136-series and 3GPP 25/36-series. It corresponds to the mobile station (MS) in GSM systems.

In accordance with one exemplary aspect of the disclosure, the mobile device or UE 110 is installed with an operating system, such as Windows 8® Operating system. After the PS attach (i.e. Packet Switching attach) in LTE is completed, the communication device 1102 save the PDP (i.e. Packet Data Protocol) context in a memory and assign a first context ID (CID1) to a first default bearer. The PS attach means that the UE registers with the network in the PS domain (i.e. Packet Switching domain) to receive services that require registration from the network. As part of the procedure by which the UE attaches to the network, the UE is assigned to an IP address by a PDN (Public Data Network) Gateway and at least one bearer is established. The bearer established is called the default bearer, and it remains established throughout the lifetime of the PDN connection in order to provide the UE with always-on IP connectivity to that PDN. Furthermore, the context ID represents an index of an attribution of a data path between the UE and the network.

In response to a connection command sent from the host 1101 which instructs the communication device 1102 to connect with the PDN 130 for example via the LTE network 120, a connection between the host 1101 and the communication device 1102 is established. Then, the communication device 1102 will check whether the APN (Access Point Name) from the host is NULL or empty, that is to say, whether the host designates certain Access Point Name (APN) in an APN field sent to the communication device 1102. If there is a value of "NULL" in the APN field or the APN field is empty, it means that the host does not designate any certain APN and the host may be assigned to any suitable Access Point by the communication device 1102.

If the APN is not NULL or empty, the communication device 1102 compares the APN with the one carried by the first default bearer. If they are not same, the communication device 1102 will activate the second default bearer and assign a second context ID (CID2) to the second default bearer, then link the connection between the host 1101 and the communication device 1102 to this second default bearer.

Otherwise, if the APN from host is NULL or empty or the same as the one carried by the first default bearer, the communication device 1102 will not activate the second default bearer, but link the connection between the host 1101 and the communication device 1102 to the first default bearer.

On the other hand, in response to a disconnection command sent from the host 1101, the communication device 1102 will determine which default bearer is linked to the current connection between the host 1101 and the communication device 1102. If the context ID (CID) of the current default bearer is the second context ID (CID2), the communication device 1102 will deactivate the second default bearer, and maintain the first default bearer to keep the communication device 1102 online. If the context ID of the current default bearer is the first context ID (CID1), the communication device 1102 will disconnect the connection between the communication device 1102 and the host 1101 without deactivating the first default bearer.

In other words, when the "disconnect" button on the Network panel of the host is detected to be triggered, the communication device will check the context ID (CID) of the current default bearer. If the context ID (CID) of the current default bearer is the second context ID (CID2), it means that there are two default bearers activated and the second one should be deactivated. If the context ID (CID) of the current default bearer is the first context ID (CID1), it means that there is only one default bearer (i.e. the first default bearer) activated, so no deactivation will be performed with the first default bearer and the connection between the communication device 1102 and the host 1101 will be disconnected.

Consequently, the communication device 1102 may constantly stay in a registered state, and the "Connect" button will always show up on the Network panel of the host. When re-clicking the "Connect" button to dial up again, the communication device 1102 re-connects with the host 1101 and links the connection to the LTE network 120.

Figure 2:
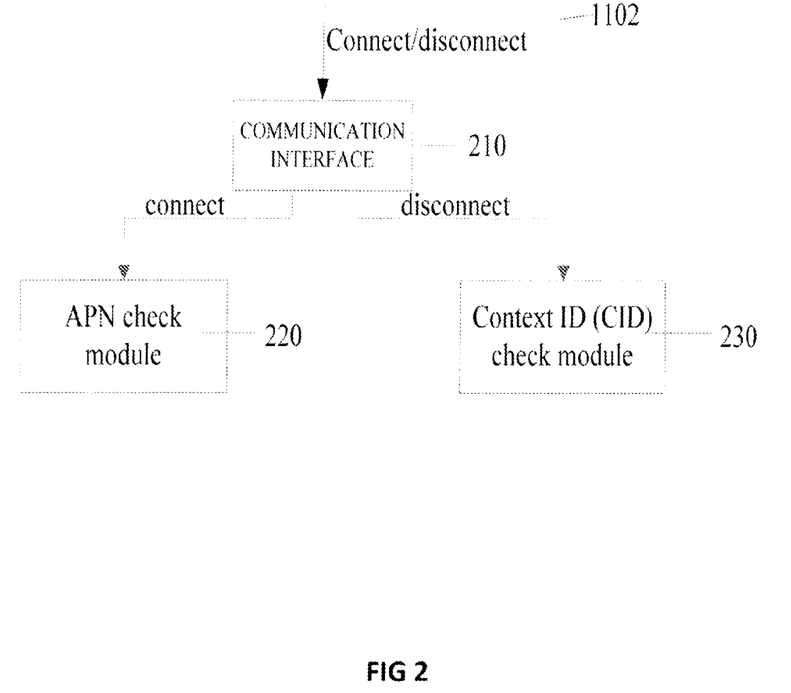
FIG. 2 is an illustration of a block diagram of an exemplary communication device in accordance with an aspect of this disclosure.
Figure 4:
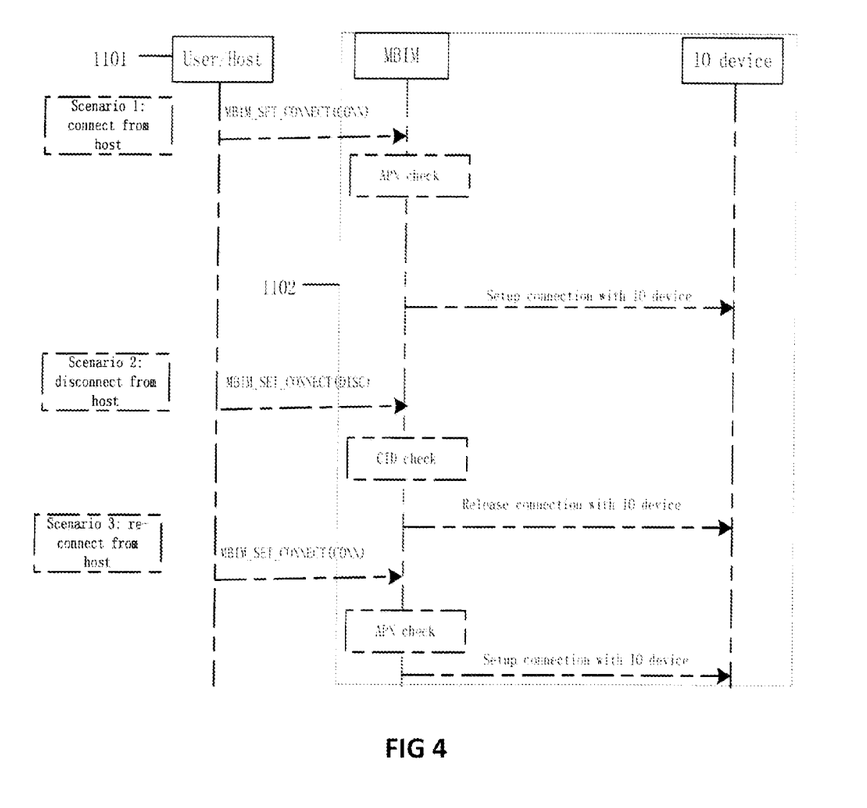
FIG. 4 is an illustration of a sequence flow of the communication system in accordance with an aspect of this disclosure.

FIG. 2 shows an illustration of a block diagram of an exemplary communication device (for example but not limited to a modem) 1102 in accordance with an aspect of this disclosure. The communication device 1102 comprises a communication interface 210, an APN check module 220, a Context ID (CID) check module 230, and IO device(s) (as shown in FIG. 4).

The communication interface 210 is configured to receive command such as connect command or disconnect command from the host. If the communication interface 210 determines that the received command is a connect command, it will instruct the APN check module 220 to check whether the APN from the host is NULL or empty.

If the APN check module 220 determines that the APN is not NULL or empty, it further compares the APN with the one carried by the first default bearer. If the APNs are not same, the APN check module 220 will activate the second default bearer and assign the second context ID (CID2) to the second default bearer, and link the connection between host and the communication device 1102 to this second default bearer. If the APN check module 220 determines that the APN from host is NULL or empty or the same as the one carried by the first default bearer, the APN check module 220 will not activate the second default bearer, but rather link the connection between host and the communication device 1102 to the first default bearer.

Furthermore, if the communication interface 210 determines that the received command is a disconnect command, it will instruct the Context ID check module 230 to determine which default bearer is linked to the current connection between the host and the communication device 1102. If the Context ID check module 230 determines that the context ID of the current default bearer is the second context ID (CID2), then it will deactivate the second default bearer, and maintain the first default bearer to keep the communication device 1102 online. If the Context ID check module 230 determines that the context ID of the current default bearer is the first context ID (CID1), it will only disconnect the connection between the communication device 1102 and host itself without deactivating the first default bearer.

As a result, the communication device (such as the modem) 1102 may constantly remain in a registered state, and the "Connect" button will always show up on the Network panel of the host. The communication device 1102 in accordance with this disclosure may resolve the issue that the connect button on the Network panel of the host cannot recover when the communication device (such as the modem) 1102 is upgraded to LTE capability and deployed on a new platform. The communication device 1102 in accordance with this disclosure tries to create the second default bearer or just disconnect the IP layer and USB, to keep the PS attached state from deregistration on LTE mode.

A method for configuring a communication device (for example but not limited to the modem) in accordance with an aspect of this disclosure will be discussed hereinafter with reference to FIG. 3.

Figure 3:
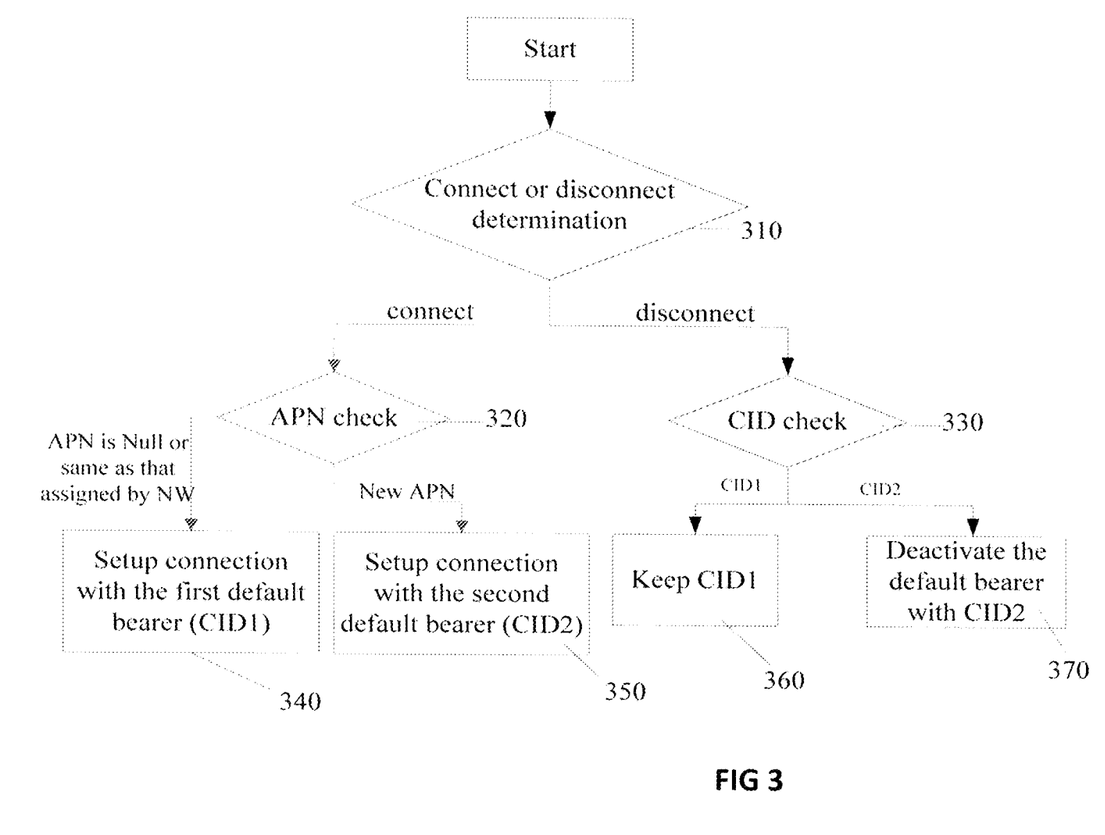
FIG. 3 is a flowchart of a method for configuring the communication device in the communication system in accordance with an aspect of this disclosure.

As shown in FIG. 3, when the "Connect" button or the "Disconnect" button is clicked on the Network panel of the host, a trigger event will be translated to a communication interface format and transmitted to the communication interface in the communication device such as the modem.

In block 310, the communication device will determine whether the trigger event relates to a connect command or a disconnect command. If the trigger event relates to the connect command, then the flow proceeds to block 320, or else, the flow proceeds to block 330.

In block 320, checking whether the APN from host is NULL or empty. If the APN is not NULL or empty, the APN from the host is compared with the one carried by the first default bearer. If they are not same, the second default bearer will be activated in block 350 and the second context ID (CID2) will be assigned to the second default bearer, then the connection between the host and the communication device is linked to this second default bearer.

If in block 320 it is determined that the APN from the host is NULL or empty or the same as the one carried by the first default bearer, the second default bearer will not be activated, and the connection between the host and the communication device will be linked to the first default bearer in block 340.

As mentioned above, if it is determined in block 310 that the trigger event relates to the disconnect command, then the Context ID check in block 330 will be performed.

In block 330, it will be determined which default bearer is linked to the connection between the host and the communication device. If the context ID of the current default bearer is the second context ID (CID2), then the second default bearer will be deactivated in block 370, and the first default bearer is maintained to keep the communication device online.

If the context ID of the current default bearer is determined to be the first context ID (CID1) in block 330, the connection between the communication device and the host will be disconnected in block 360 and the first default bearer will not be deactivated.

The process terminates at steps 340, 350, 360, and 370 accordingly.

FIG. 4 is an illustration of a sequence flow of the communication system in accordance with an aspect of this disclosure.

As shown in FIG. 4, the User/Host 1101 triggers PS dialup via a communication interface command (e.g. "MBIM_SET_CONNECT (CONN)" command in FIG. 4) in the first scenario.

Then, an APN check will be performed in the communication device 1102 (for example but not limited to the modem), that is to say, the APN carried by the communication interface command is compared with the APN assigned by network. The APN check in FIG. 4 is similar to the APN check performed in block 320 of FIG. 3. Based on the result of the APN check, the connection with IO device is setup. In the second scenario, the User/Host 1101 triggers disconnect event in LTE mode via another communication interface command (e.g. "MBIM_SET_CONNECT (DISC)" command in FIG. 4), the context ID of the current default bearer will be checked in the communication device 1102 as shown in FIG. 4. The context ID check in FIG. 4 is similar to the context ID check performed in block 330 of FIG. 3. If it is determined that there are two default bearers (for example the first default bearer and the second default bearer) activated, the second one will be deactivated. If it is determined that there is only one default bearer, the default bearer will be remained and only the data channel is released.

As shown in FIG. 4, in the third scenario, if the User/Host 1101 triggers reconnect event via a communication interface command (e.g. "MBIM_SET_CONNECT (CONN)" command), the APN check will be performed again in the communication device 1102. Similar to the first scenario, the connection with IO device will be setup based on the result of APN check.

According to another aspect of this disclosure, if the "disconnect" button is detected to be clicked on the Network panel of the host in the LTE mode, the communication device (for example but not limited to the modem) detaches or deregisters from the network, and then performs the PS attach automatically. As a result, the communication device recovers to normal service automatically in a quick manner. The "Connect" button will appear on the Network panel of the host again. Such an alternative solution may take very little time (substantially less than 1 s), which is almost invisible to end user.

There is an advantage of the solutions described above that the communication device (for example but not limited to the modem), mobile device and/or UE in accordance with this disclosure can be compatible with 2G/3G communication device such as 2G/3G modem, only enhancing the part of LTE operation, which will reduce the complexity of protocol stack of the communication device such as the modem. No change is needed on the host side.

Furthermore, there is another advantage of this disclosure that this disclosure can resolve the issue that the "connect" button cannot recover when the communication device such as the modem is upgraded to LTE capability and deployed on a new platform.

The flowcharts and block diagrams in the different depicted aspects illustrate the architecture, functionality, and operation of some possible implementations of apparatus, methods, system, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The above embodiments can be implemented by hardware, software or firmware or a combination thereof. For example the various methods, processes and functional modules described herein may be implemented by a processor (the term processor is to be interpreted broadly to include a CPU, processing unit, ASIC, logic unit, or programmable gate array etc.). The processes, methods and functional modules may all be performed by a single processor or split between several processors; reference in this disclosure or the claims to a 'processor' should thus be interpreted to mean 'one or more processors'. The processes, methods and functional modules be implemented as machine readable instructions executable by one or more processors, hardware logic circuitry of the one or more processors or a combination thereof. Further the teachings herein may be implemented in the form of a software product. The computer software product is stored in a storage medium and comprises a plurality of instructions for making a computer device (which can be a personal computer, a server or a network device such as a router, switch, access point etc.) implement the method recited in the embodiments of the present disclosure.

The following examples pertain to further embodiments.

EXAMPLE 1

A communication device, comprising:
a Context ID check module to check a Context ID of a current default bearer in response to a disconnect command from a host;

wherein the Context ID check module determines if a first default bearer is activated based on the current default bearer, and releases a connection between the communication device and the host while maintaining the first default bearer online if the first default bearer is activated.

EXAMPLE 2

The communication device in accordance with example 1, wherein the Context ID check module determines if a second default bearer is also activated based on the current default bearer, and releases the second default bearer if the second default bearer is also activated.

EXAMPLE 3

The communication device in accordance with Example 2, wherein
the Context ID check module determines whether a context ID of the current default bearer is same as a Context ID of the second default bearer to determine if the second default bearer is also activated.

EXAMPLE 4

The communication device in accordance with Example 1, wherein
if the Context ID check module determines that the context ID of the current default bearer is same as a Context ID of the first default bearer, the first default bearer is activated.

EXAMPLE 5

The communication device in accordance with Example 1, further comprising:
a APN check module to check whether the Access Point Name (APN) from the host is empty or NULL in response to a connect command from the host, and compare the APN with an APN carried by the first default bearer if the APN check module determines that the APN is not empty or NULL.

EXAMPLE 6

The communication device in accordance with Example 5, wherein
the APN check module further activates the second default bearer, assign a second Context ID to the second default bearer, and link the host with the second default bearer, if the APN from the host is not empty or NULL and not same as the APN carried by the first default bearer.

EXAMPLE 7

The communication device in accordance with Example 5 or 6, wherein
the APN check module further links the host to the first default bearer if the APN from host is empty or NULL or same as the APN carried by the first default bearer.

EXAMPLE 8

The communication device in accordance with any one of Examples 1-7, wherein
the communication device is an LTE capable communication device.

EXAMPLE 9

The communication device in accordance with Example 8, wherein the communication device is a modem.

EXAMPLE 10

The communication device in accordance with any one of Examples 1-9, wherein
the disconnect command is used to instruct the communication device to disconnect the link between the host and an LTE network.

EXAMPLE 11

The communication device in accordance with any one of Examples 1-10, wherein
the connect command is used to instruct the communication device to connect the link between the host and the LTE network.

EXAMPLE 12

An user equipment, comprising:
a host; and
a communication device as defined in any one of the previous Examples 1-11.

EXAMPLE 13

The user equipment in accordance with Example 12, wherein the host is installed with an Operating system.

EXAMPLE 14

The user equipment in accordance with Example 12 or 13, wherein the communication device is coupled to the host via a communication interface.

EXAMPLE 15

A communication system, comprising the user equipment as defined in any one of Examples 12-14, and the user equipment is coupled to LTE network.

EXAMPLE 16

A method for configuring a communication device, comprising:
checking a Context ID (CID) of a current default bearer in response to a disconnect command from a host;
if a first default bearer is activated, releasing a connection between the communication device and the host while maintaining the first default bearer online.

EXAMPLE 17

The method in accordance with Example 16, wherein
if a second default bearer is also activated, releasing the second default bearer.

EXAMPLE 18

The method in accordance with Example 16, wherein
if a context ID of the current default bearer is same as a Context ID of the second default bearer, the second default bearer is also activated.

EXAMPLE 19

The method in accordance with Example 16, wherein
if a context ID of the current default bearer is same as a Context ID of the first default bearer, the first default bearer is activated.

EXAMPLE 20

The method in accordance with Example 16, further comprising:
checking whether the Access Point Name (APN) from the host is empty or NULL in response to a connect command from the host; and
if the APN from the host is not empty or NULL, comparing the APN with the APN carried by the first default bearer.

EXAMPLE 21

The method in accordance with Example 20, wherein
if the APN from the host is not empty or NULL and not same as the APN carried by the first default bearer, assigning a second Context ID to the second default bearer, and linking the host with the second default bearer.

EXAMPLE 22

The method in accordance with Example 20 or 21, wherein
if the APN from the host is empty or NULL or same as the APN carried by the first default bearer, linking the host to the first default bearer.

EXAMPLE 23

The method in accordance with any one of Examples 16-22, wherein
the communication device is an LTE capable communication device.

EXAMPLE 24

The method in accordance with Example 23, wherein the communication device is a modem.

EXAMPLE 25

The method in accordance with any one of Examples 16-24, wherein
the disconnect command is used to instruct the communication device to disconnect the link between the host and the LTE network.

EXAMPLE 26

The method in accordance with any one of Examples 16-25, wherein
the connect command is used to instruct the communication device to connect the link between the host and the LTE network.

EXAMPLE 27

At least one machine readable medium comprising a plurality of instructions that in response to being executed on a computing device, cause the computing device to carry out a method according to any one of Examples 16-26.

EXAMPLE 28

A communication device, comprising:
a processor; and
a memory storing a plurality of instructions that in response to being executed on the processor, cause the processor to carry out a method according to any one of Examples 16-26

EXAMPLE 29

An apparatus for configuring a communication device, comprising:
means to check a Context ID (CID) of a current default bearer in response to a disconnect command from a host;
means to release a connection between the communication device and the host while maintaining the first default bearer online if a first default bearer is activated.

EXAMPLE 30

The apparatus in accordance with Example 29, further comprises
means to release a second default bearer if the second default bearer is also activated.

EXAMPLE 31

The apparatus in accordance with Example 29, wherein if a context ID of the current default bearer is same as a Context ID of the second default bearer, the second default bearer is also activated.

EXAMPLE 32

The apparatus in accordance with Example 29 or 31, wherein
if a context ID of the current default bearer is same as a Context ID of the first default bearer, the first default bearer is activated.

EXAMPLE 33

The apparatus in accordance with Example 29, further comprising:
means to check whether the Access Point Name (APN) from the host is empty or NULL in response to a connect command from the host; and
means to compare the APN with the APN carried by the first default bearer if the APN from the host is not empty or NULL.

EXAMPLE 34

The apparatus in accordance with Example 33, wherein
means to assign a second Context ID to the second default bearer and link the host with the second default bearer, if the APN from the host is not empty or NULL and not same as the APN carried by the first default bearer.

EXAMPLE 35

The apparatus in accordance with Example 33 or 34, wherein
means to link the host to the first default bearer if the APN from the host is empty or NULL or same as the APN carried by the first default bearer.

EXAMPLE 36

The apparatus in accordance with any one of Examples 29-35, wherein
the communication device is an LTE capable communication device.

EXAMPLE 37

The apparatus in accordance with Example 36, wherein the communication device is a modem.

EXAMPLE 38

The apparatus in accordance with any one of Examples 29-37, wherein
the disconnect command is used to instruct the communication device to disconnect the link between the host and the LTE network.

EXAMPLE 39

The apparatus in accordance with any one of Examples 29-38, wherein
the connect command is used to instruct the communication device to connect the link between the host and the LTE network.

EXAMPLE 40

A communication device, comprising:
a logic to detach or deregister from a mobile network and perform Packet switching attach automatically in response to a disconnect command from a host installed with an Operating system.

EXAMPLE 41

The communication device in accordance with Example 40, wherein
the communication device is an LTE capable modem.

EXAMPLE 42

A method for configuring a communication device, comprising:
detaching or deregistering from a mobile network in response to a disconnect command from a host installed with an Operating system; and;
performing Packet switching attach automatically.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication device, comprising:
   a Context ID check circuit to check a Context ID of a current default bearer in response to a disconnect command from a host; and
   an Access Point Name (APN) check circuit to check whether the host designated a particular APN in response to a connect command from the host, if a particular APN is designated, compare the particular APN with an APN carried by the first default bearer to determine whether a first default bearer is activated;
   wherein the Context ID check circuit determines if a first default bearer is activated based on the current default bearer, and releases a connection between the communication device and the host while maintaining the first default bearer online if the first default bearer is activated.

2. The communication device in accordance with claim 1, wherein the Context ID check circuit determines if a second default bearer is also activated based on the current default bearer, and releases the second default bearer if the second default bearer is also activated.

3. The communication device in accordance with claim 2, wherein the Context ID check circuit determines whether the context ID of the current default bearer is same as a Context ID of the second default bearer to determine if the second default bearer is also activated.

4. The communication device in accordance with claim 1, wherein if the Context ID check circuit determines that the context ID of the current default bearer is same as a Context ID of the first default bearer, the first default bearer is activated.

5. The communication device in accordance with claim 1, wherein the APN check circuit further activates the second default bearer, assign a second Context ID to the second default bearer, and link the host with the second default bearer, if the APN from the host is not empty or NULL and not same as the APN carried by the first default bearer.

6. The communication device in accordance with claim 1, wherein the APN check circuit further links the host to the first default bearer if the APN from host is empty or NULL or same as the APN carried by the first default bearer.

7. The communication device in accordance with claim 1, wherein the communication device is an LTE capable communication device.

8. The communication device in accordance with claim 1, wherein the Context ID check circuit checks a Context ID of a current default bearer of an established connection between the communication device and the host.

9. A method for configuring a communication device, comprising:
   checking a Context ID (CID) of a current default bearer in response to a disconnect command from a host;
   checking whether a particular Access Point Name (APN) from the host is designated in response to a connect command from the host; and
   comparing the particular APN with the APN carried by the first default bearer to determine whether a first default bearer is activated;
   if a first default bearer is activated, releasing a connection between the communication device and the host while maintaining the first default bearer online.

10. The method in accordance with claim 9, wherein if a second default bearer is also activated, releasing the second default bearer.

11. The method in accordance with claim 9, wherein if the context ID of the current default bearer is same as a Context ID of the second default bearer, the second default bearer is also activated.

12. The method in accordance with claim 9, wherein if the context ID of the current default bearer is same as a Context ID of the first default bearer, the first default bearer is activated.

13. The method in accordance with claim 9, wherein if the APN from the host is not empty or NULL and not same as the APN carried by the first default bearer, assigning a second Context ID to the second default bearer, and linking the host with the second default bearer.

14. The method in accordance with claim 9, wherein if the APN from the host is empty or NULL or same as the APN carried by the first default bearer, linking the host to the first default bearer.

15. An apparatus for configuring a user equipment device, comprising:
   a host;
   means to check a Context ID (CID) of a current default bearer in response to a disconnect command from the host;
   means to check whether a particular Access Point Name (APN) from the host is designated in response to a connect command from the host;
   means to compare the particular APN with the APN carried by the first default bearer to determine whether a first default bearer is activated; and
   means to release a connection between the user equipment device and the host while maintaining the first default bearer online if a first default bearer is activated.

16. The apparatus in accordance with claim 15, further comprising, means to release a second default bearer if the second default bearer is also activated.

17. The apparatus in accordance with claim 15, wherein if the context ID of the current default bearer is same as a Context ID of the second default bearer, the second default bearer is also activated.

18. The apparatus in accordance with claim 15, wherein if the context ID of the current default bearer is same as a Context ID of the first default bearer, the first default bearer is activated.

19. The apparatus in accordance with claim 15, wherein the apparatus further comprises
   means to assign a second Context ID to the second default bearer and link the host with the second default bearer, if the APN from the host is not empty or NULL and not same as the APN carried by the first default bearer.

20. The apparatus in accordance with claim 15, wherein the apparatus further comprises
   means to link the host to the first default bearer if the APN from the host is empty or NULL or same as the APN carried by the first default bearer.

* * * * *